Dec. 11, 1923.
H. H. HARRIS
TIRE CONSTRUCTION
Filed April 27, 1923
1,477,442
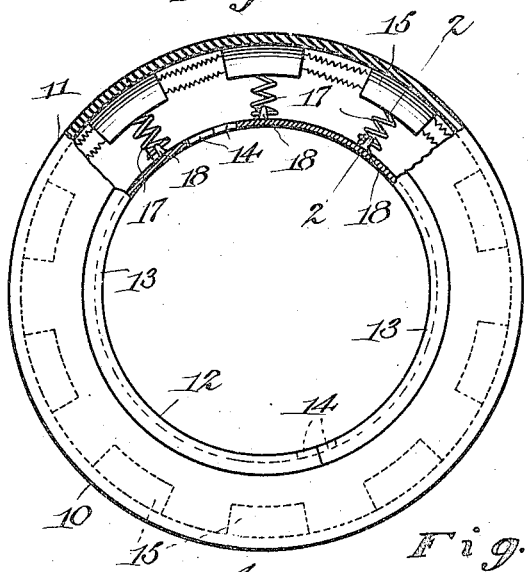
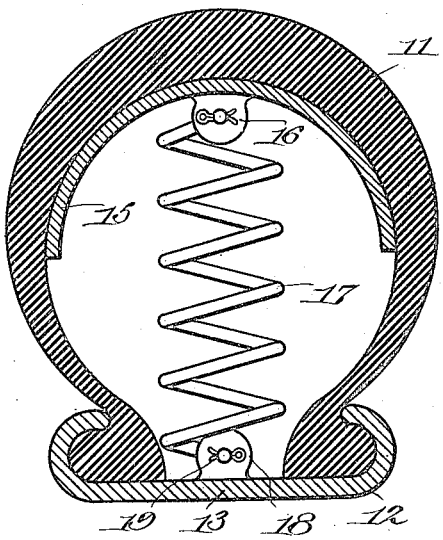
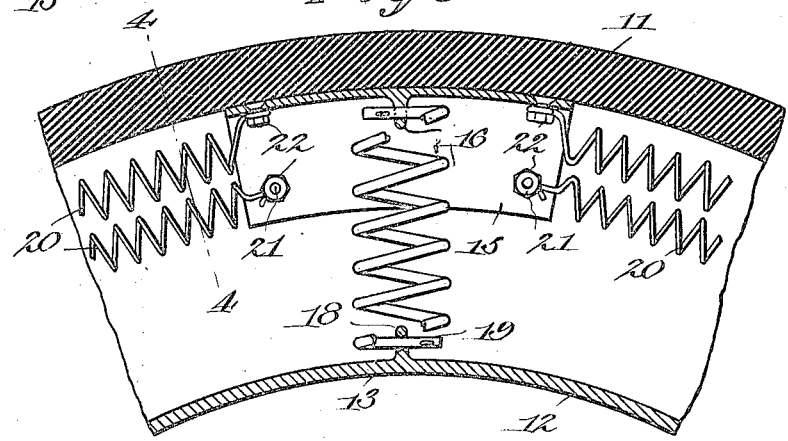
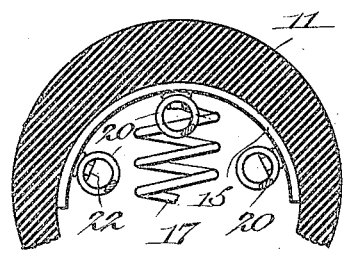
Homer H. Harris
INVENTOR
BY Victor J. Evans
ATTORNEY
WITNESS: Wm. C. Michael Patented Dec. 11, 1923.

1,477,442

UNITED STATES PATENT OFFICE.

HOMER H. HARRIS, OF RED BANK, NEW JERSEY.

TIRE CONSTRUCTION.

Application filed April 27, 1923. Serial No. 635,081.

*To all whom it may concern:*

Be it known that I, HOMER H. HARRIS, a citizen of the United States, residing at Red Bank, in the county of Monmouth and State of New Jersey, have invented new and useful Improvements in Tire Constructions, of which the following is a specification.

This invention relates to tire construction and has for its primary object the provision of a tire so constructed as to render the same puncture proof.

Another object of the invention is to provide a tire which has all the features of a pneumatic tire, but wherein the usual inner tube is disposed of and a yieldable mechanical means substituted therefor.

A further object of the invention is the provision of a tire construction having cushioning means, which means are capable of absorbing shocks and vibrations which may occur when the same is travelling over an uneven road bed.

A still further object of the invention is to construct a tire having cushioning means interposed between the casing or shoe and the rim, whereby the said means serve the purpose of the usual well-known pneumatic inner tube.

With these and other objects in view, the invention resides in the certain novel construction, combination and arrangement of parts, the essential features of which are hereinafter fully described in the specification, are pointed out in the appended claims, and shown in the accompanying drawing, in which:—

Figure 1 is a side elevation of my improved tire with a part broken away and shown in section.

Figure 2 is a transverse sectional view taken on the line 2—2 of Figure 1.

Figure 3 is a longitudinal sectional view of a portion of the tire.

Figure 4 is a transverse sectional view taken on the line 4—4 of Figure 3.

Referring more particularly to the drawing, the reference numeral 10 designates my improved vehicle wheel in its entirety, which includes the usual casing or shoe 11 and rim 12. The construction of the parts mentioned are old in the art with the exception that the rim 12 is made up of two sections which are designated by the numeral 13 and having their meeting ends provided with slots 14 for permitting access to the interior of the casing for a purpose to be presently described.

Spaced radially and equi-distantly within the casing 11 are plates 15, of steel or other like material, and being of a shape in cross-section as to snugly fit the inner tube of the casing as shown in Figure 2 of the drawing. Each plate 15 is provided centrally thereof with a boss or depending lug 16, the same having an aperture therein to receive one end of a helical spring 17, the other end of the spring having connection with a similar boss 18 formed on the rim sections 13. It will be understood that there will be as many springs 17 and lugs 18 as there are plates 15, and that the description of one will suffice for all. The terminals of the springs 17 may have cotter-pins 19 passed therethrough for preventing the same from working loose from the lugs, the pins of course being capable of removal should it be desired to replace any of the springs 17. From the structure so far described it is apparent that the springs 17 are of such strength as to force the plates 15 outwardly against the tread of the tire 11, so as to always hold the same in an extended condition, and serves as a cushion for absorbing any shock or vibration due to uneven surfaces over which the tire may come in contact with. Connecting the plates 15 with each other are yieldable tensioning members, in the nature of springs 20, there being three connected to each end of the plates 15. The springs 20 are removably connected with the plates by means of bolts 21 over which the ends of the springs are adapted to be passed, and are held thereon by means of nuts 22. The springs 20 hold the plates 15 in their respective positions and permit a certain amount of circumferential movement but always returning the parts to their normal position.

Should it be desired to remove the casing 11 from the rim 12, the spring 20 nearest the openings 14 are disconnected with one of the plates 15 after which one of the rim sections 13 is removed and then the other section 13. It will therefore be manifest should it be desired to move the casing 11, the same may be done in the minimum amount of time and with little difficulty. It will also be understood that the structure shown is extremely simple and yet so constructed as to absorb all shocks and vibration such as are now taken up by the use of pneumatic tire requiring the use of inner tubes. With this type of tire the inner tube will be eliminated thereby rendering the same puncture proof.

While there has been shown what is considered the preferred form of the invention, it will be understood that changes, alterations and modifications as come within the claims may be resorted to when desired.

What is claimed as new is:—

1. A tire structure comprising a casing, a rim of two sections adapted to engage said casing, a plurality of plates spaced radially and equi-distantly within said casing, yieldable elements connecting said plates with said rim and tending to force the said plates against the tread of said casing, and yieldable connecting means between said plates and detachable therewith, and slots formed in the meeting ends of the rim sections to permit access to certain of said yieldable connecting means.

2. A tire structure comprising a casing, a rim of two sections adapted to engage said casing, a plurality of plates spaced radially and equi-distantly within said casing, yieldable elements connecting said plates with said rim and tending to force the said plates against the tread of said casing, detachable contractile springs connecting said plates, and slots formed in the meeting ends of said rim sections for permitting the disconnection of certain of said contractile springs while the casing is in position upon the rim.

3. A tire structure comprising an outer casing, a rim for engagement with said casing, a plurality of equi-distantly spaced arcuate shaped plates arranged radially in said casing, a spring detachably connected to each of said plates and to the adjacent portion of the rim, a plurality of springs connecting the plates in a series, means for detachably securing said springs to said plates, and means in said rim for permitting access to certain of said plurality of springs for detachably connecting the same.

In testimony whereof I have affixed my signature.

Mr. HOMER H. HARRIS.